Patented Dec. 1, 1942

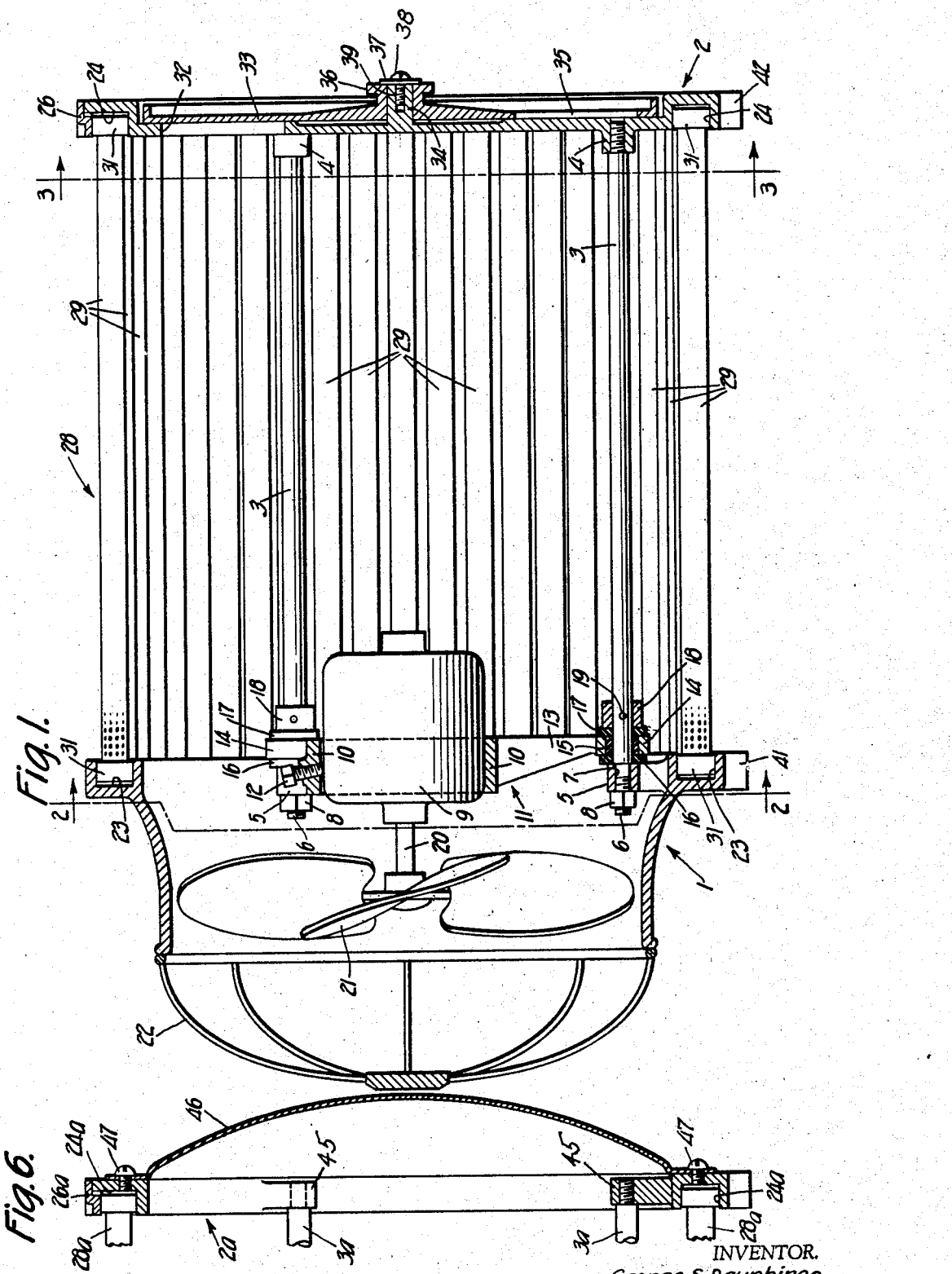

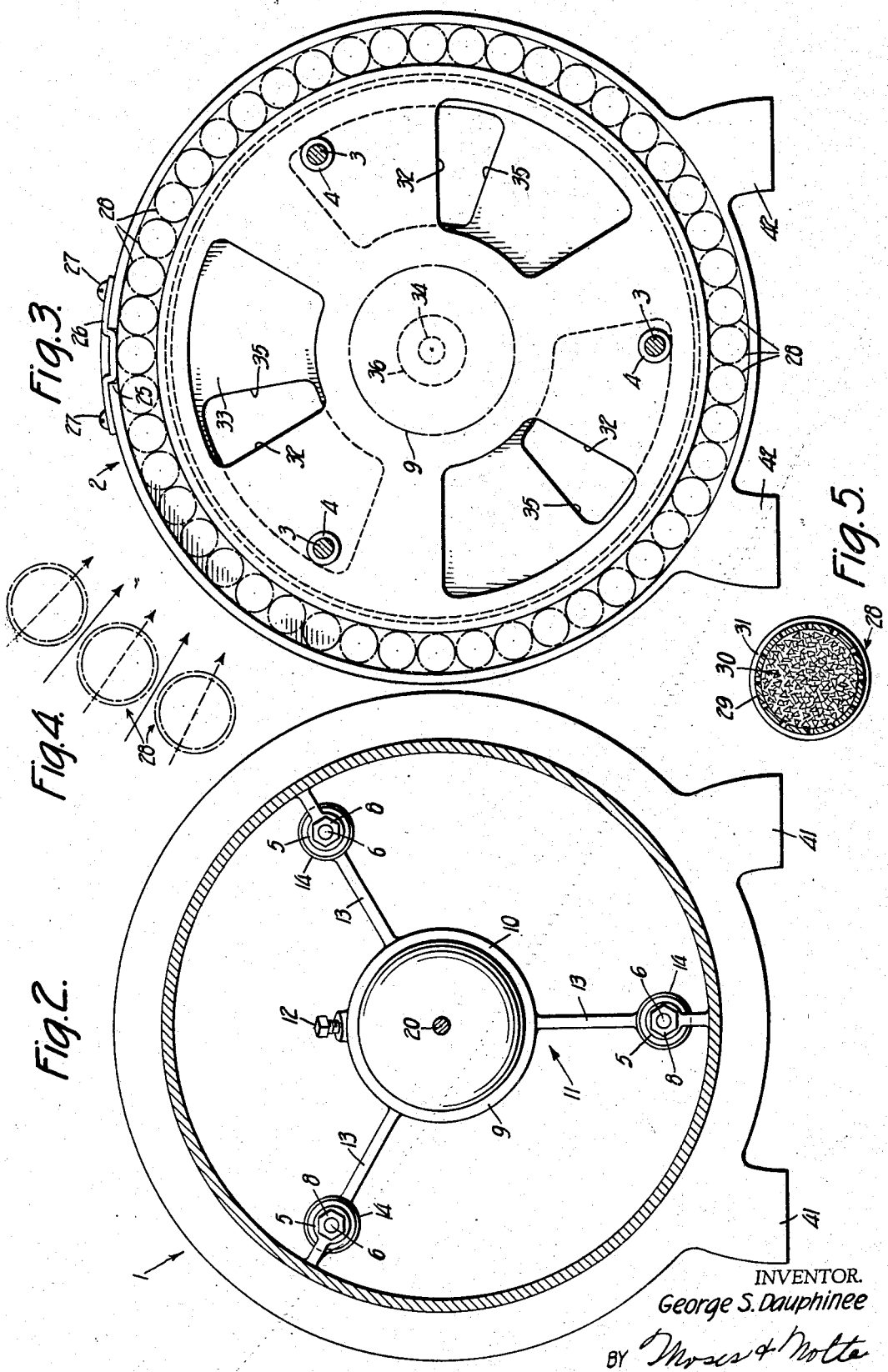

2,303,333

UNITED STATES PATENT OFFICE 2,303,333

AIR PURIFYING AND CIRCULATING DEVICE

George S. Dauphinee, Brooklyn, N. Y., assignor to W. B. Connor Engineering Corp., New York, N. Y., a corporation of New York Application February 19, 1940, Serial No. 319,608

7 Claims. (Cl. 183—4)

This invention relates to air purifying and circulating devices, and more particularly to a device adapted to remove odorous impurities from the air of a room.

A device of this character is useful in a variety of situations. It can be used to advantage in a hospital room, for example, to rid the room of the odor of disinfectants, and other unpleasant odors. It is useful for household service, particularly for confining and adsorbing cooking odors in the kitchen, without permitting such odors to spread to other rooms of the house or apartment.

It is an important object of the present invention to provide a device which will function with a high degree of effectiveness as an odor adsorber and simultaneously as an effective air circulating device.

The air circulating function of the device is useful both in aid of the odor adsorbing function and independently thereof.

If the room is closed or substantially closed, it is desirable that the air circulation extend to all portions of the room so as to assure that the benefits of odor adsorption will reach the entire room; also that the air taken in by the device and treated for odors shall be air which contains the odorous impurities in a concentration which is at least as great as the average concentration of such impurities in the room. The circulation of the air in closed rooms which are either heated or air conditioned also contributes to the comfort and health of the occupants independently of odor adsorption.

The odor adsorbing function of the device is of particular utility when external weather conditions are such as to require the windows to be kept closed, or substantially closed; also in air conditioned rooms, apartments or other occupied enclosures where, for reasons of economy, the admission of fresh outside air is restricted. The air circulatory function of the device has particular utility in maintaining air movement or circulation in heated or otherwise air conditioned enclosures. During hot humid weather air movement or circulation is greatly appreciated in occupied enclosures which are not air conditioned.

A further object of this invention is to provide an air purifying and circulating device, one preferably wherein a popular simple circulating propeller fan may be satisfactorily employed in combination with an odor adsorbent means so constructed in relation to its permeability to air flow therethrough as not seriously to reduce the circulatory capacity of such a type of fan below its capacity at free flow while providing a large measure of air purification and withal to operate within the noise limitations established for fan devices in domestic service. The invention is not confined to the utilization of this particular type of fan.

Further objects of the invention have to do with the provision of a device of the general character stated which is compact and simple in construction, economical to manufacture, and sturdy and efficient in use.

Other objects and advantages will hereinafter appear.

In the drawings forming part of this specification:

Fig. 1 is a sectional view in side elevation of an air purifying and circulating device embodying features of the invention;

Fig. 2 is a sectional view taken upon the line 2—2 of Fig. 1 looking in the direction of the arrows;

Fig. 3 is a sectional view taken upon the line 3—3 of Fig. 1, looking in the direction of the arrows before the adsorbent units have been put into place, the adsorbent units being indicated, nevertheless, in dot and dash lines;

Fig. 4 is a diagrammatic view on a larger scale than the other figures, illustrating substantially the relative size and spacing of a series of the adsorbent units employed in the purifying and circulating device, the spacing being provided by the rod caps which are not shown;

Fig. 5 is a transverse, sectional view through one of the adsorbent units; and

Fig. 6 is a fragmentary view in sectional elevation illustrating a modification.

The device comprises end members 1 and 2, which will be described in greater detail hereinafter, but which, for the present, may simply be referred to as generally circular in form and as connected to one another by three equally spaced tie-rods 3. Each tie-rod 3 is threaded at one end into a boss 4 of the end member 2, and passes at its other end through an inwardly reaching socket boss 5 of the other end member 1. Each tie-rod has a reduced, threaded end portion 6, for passing through a cylindrical bore 7 of one of the supporting bosses 5. A shoulder is formed at the junction of the reduced end portion 6 of the tie-rod 3 with the portion of the tie-rod which is of normal diameter, and this shoulder abuts the right-hand face of the supporting boss 5. A nut 8, threaded onto the reduced threaded end 6 of each tie-rod, clamps the tie-rod to the supporting boss 5.

A fan motor 9 is mounted in a hub 10 of a motor supporting spider 11 and is held therein by means of a set screw 12. The spider 11 includes three equally spaced arms 13, which radiate from the hub of the spider, and which are formed with supporting socket bosses 14 at their outer ends. Each of the arms 13 is mounted upon one of the tie-rods 3 adjacent to the supporting boss 5 of the tie-rod, so that a three-point suspension is provided for the spider 11. Resilient, vibration, damping material, such as rubber, is utilized for mounting the spider upon the tie-rods, so as to insulate the tie-rods and their supports against motor vibration. A rubber ring 15 is disposed within the boss 14 and around the tie-rod 3, and rubber washers 16 and 17 are disposed upon the tie-rod at opposite sides of the boss 14. The washer 16 provides a cushion between the boss 14 and the boss 5. The washer 17 provides a cushion between the boss 14 and a collar 18 which is fixed to the tie-rod 3 by a pin 19. The collar 18 is so positioned upon the tie-rod 3 that the resilient vibration damping material is maintained under suitable pressure.

The motor includes a shaft 20, upon which a fan 21 of the axial discharge type is affixed. By a fan of the axial discharge type is meant a fan which throws the air in the general direction of the axis of rotation of the fan, as distinguished from one which throws the air radially outward.

The end member 1 is formed as a throat or a nozzle which closely surrounds the fan. This throat converges as it approaches the fan from the intake side of the fan, and terminates in an end portion of cylindrical contour. It is coaxial with the fan and the fan motor, and is of the "long throw" type, being designed to enable the fan to project the air to remote portions of a room, so that any tendency to permit stagnant pockets of air to persist is minimized. The throat or nozzle of the end member 1 is covered by the usual protective wire guard or grille 22.

The end members 1 and 2 are formed with confronting, registering, circular channels 23 and 24. The channel 24 has a side opening 25 at the upper, outer side thereof. A closure plate 26 is removably secured in place by means of screws 27 for the purpose of normally closing the opening. Rod-like odor adsorbent units 28, which may be generally similar to those disclosed in my pending application Serial No. 267,651, filed April 13, 1939, for Air conditioning devices, are set with their left-hand and right-hand ends lodged respectively in the channels 23 and 24, these units, together with the end members 1 and 2, constituting a cage which defines a cylindrical chamber at the intake side of the fan, coaxial with the fan, through which air must pass in order to reach the fan.

Each of the units 28 consists of a thin-walled, perforate metallic tube 29, which is filled with granular activated carbon 30. The ends of each tube are closed by a thin-walled cap 31 having a narrow flange disposed in surrounding relation of the associated end of the tube. The flanged wall is made very thin in order to minimize the spacing of the tube walls from one another, so that there will not be an excessive or objectionable free air space intervening between adjacent adsorbent units. Most of the units can be put in place in the opposed channels 23 and 24 simply by tilting them, and then working their ends into the channels. The units 28 are intended to extend completely around the circular channels 23 and 24, and hence it is necessary to provide the opening 25 and a removable closure means therefor, in order to enable the last of the units to be inserted.

The end member 2 is formed with a series of large air admission openings, disposed at equal intervals about the axis of the chamber. The circular valve or damper plate 33 is mounted upon an axially disposed stud 34, which projects outwardly from the end member 2. The valve or damper 33 is formed with a series of large, equally spaced openings 35, which correspond in size and spacing with the openings 32 of the end member 2. The valve or damper 33 is formed with an operating head or finger piece 36. A retaining washer 37 overlies a portion of the head 36 for retaining the damper in place, and a screw 38 is passed through the washer and threaded into a bore 39 of the stud 34.

The provision for passing air in regulated quantity through the end member 2 is to enable the air circulating effect to be augmented when this requirement takes precedence over the purifying effect. Opening the damper 33 eases the flow of air to the fan and permits it to operate at substantially its full free volumetric efficiency, thereby increasing the circulatory effect at a small sacrifice in purifying effect.

The end members 1 and 2 are formed with supporting feet 41 and 42, respectively, in the illustrated embodiment of the invention. When equipped with these feet, the device is adapted to be employed with its axis extending horizontally as illustrated in Fig. 1. It is also contemplated, however, to employ this device with its axis in a vertical position. In this latter case the feet 41 and 42 can be omitted and suitable, obvious means for support provided.

The construction illustrated in Figure 6 is generally similar to that already described, but instead of providing for a regulated intake of air through the end of the casing remote from the fan, that end of the casing is permanently closed. The construction is in all respects the same as that of the embodiment of Figures 1 to 5 subject to the exceptions noted below. The tie-rods 3a are supported in socket bosses 45 of an end member 2a, the tie-rods being threaded into the bosses 45. The end member 2a is formed with a circular channel 24a having an opening at the top, which opening is closed by a removable closure plate 26a. The channel 24a receives the right-hand ends of odor adsorbent units 28a. A cover plate 46 is secured to the end member 2a by means of screws 47. The cover member 46 completely and permanently closes the illustrated end of the casing.

Either device, as illustrated and described, forms an extremely compact and practical unit which is adapted to function with high efficiency, either for odor adsorption, or for air circulation purposes, or both. It has further merit that the motor and the fan are protected against injury and are substantially concealed from view by the cage. The device as a whole is not only useful, but is of attractive appearance because of its symmetrical and graceful construction, and because all unsightly parts are concealed from view.

I have described what I believe to be the best embodiments of my invention. I do not wish, however, to be confined to the embodiments shown, but what I desire to cover by Letters Patent is set forth in the appended claims.

I claim:

1. An air purifying and circulating device comprising, in combination, a fan of the axial discharge type substantially free from obstruction at the discharge side thereof, a frame surrounding the fan and including an unobstructed, long throw, air guiding throat, air-pervious odor adsorbent means mounted in said frame and defining with the frame a chamber at the intake side of the fan through the said air-pervious means of which a substantial portion of the air flows to the fan, said chamber having substantially unobstructed communication with the fan, and said frame including a perforate end wall for said chamber at the end thereof remote from the fan, and adjustable means for regulating the passage of air through said end wall.

2. An air purifying and circulating device comprising, in combination, a fan of the axial discharge type, a fan motor having a shaft upon which the fan is mounted, a cage defining a substantially cylindrical chamber at the intake side of the fan through the peripheral wall of which air flows inward to the fan, said cage comprising connected end members and spaced air-pervious, odor adsorbent units mounted in the end members to define the peripheral wall of the cage, tie-rods that extend between and unite and space the end members, and motor supporting means mounted on said tie-rods.

3. An air purifying and circulating device comprising, in combination, a fan of the axial discharge type, a fan motor having a shaft upon which the fan is mounted, a cage defining a substantially cylindrical chamber at the intake side of the fan through the peripheral wall of which air flows inward to the fan, said cage comprising connected end members and elongated, air-pervious odor adsorbent units mounted to extend in parallel relation between the end members to define the peripheral wall of the cage, and means supporting the fan motor within the cage in coaxial relation with the cage, comprising tie-rods that extend between and unite the end members, and a spider support for the motor mounted on said tie-rods, said spider including a ring for receiving the motor, and means for securing the motor fixedly to the ring.

4. In an air purifying and circulating device which includes a fan of the axial discharge type, a cage defining a chamber through the peripheral wall of which air flows inward to the fan, said cage comprising end members rigidly connected together at a fixed distance from one another, said end members being formed with confronting channels, and spaced, air-pervious adsorbent bars having their opposite ends set in the respective channels for defining the peripheral wall of the cage.

5. An air purifying and circulating device comprising, in combination, an open end member, a closed end member, means connecting said end members in coaxial and spaced relation, a set of spaced, parallel, air-pervious bars bridging the space between the said end members and defining the peripheral wall of a cage-like chamber; a motor driven fan unit mounted inside said cage-like chamber disposed to draw air into the chamber through, around and between said air-pervious bars forming said wall and to discharge said air unobstructedly from the chamber through the said open end member; the spacing and transverse dimensions of said bars being so related to one another that a predetermined, substantial portion of the air to the fan will flow directly through said porous bars and a portion will flow through the chinks provided by said spacing.

6. An air purifying and circulating device comprising, in combination, an open end member formed to provide an unobstructed, long throw, air guiding throat, a second end member remote therefrom, means connecting said end members in coaxial and spaced relation, a set of air-pervious bars to bridge the space between the said end members and thereby to define the peripheral wall of a cage-like chamber; a motor driven fan unit mounted inside said cage-like chamber disposed to draw the air into the chamber through, around and between the porous bars forming said wall, and to discharge said air unobstructedly from the chamber through the throat of said open end member; said bars being disposed in such spaced relation to one another that a substantial portion of the air flowing through the peripheral wall will flow through said air-pervious bars and a portion will flow through the chinks provided by said spacing, and damper means associated with the second of the end members and adjustable to regulate admission of air to the chamber through said end member.

7. A combined air purifying, circulating, and mixing device comprising a basket-like enclosure having an open end member so formed as to provide a smooth, unobstructed, and well rounded air discharge nozzle at one end of said enclosure, a closure member at the opposite end of the enclosure, said member provided with a free air inlet opening of limited area, a peripheral wall of air permeable construction composed of gas adsorbing material to complete said enclosure, a fan unit mounted within the enclosure in alignment with said open end member and in position simultaneously to draw air inwardly through said peripheral air permeable wall and through said free air inlet opening, and to discharge it outwardly through said nozzle in the form of a high velocity jet, the area of said air permeable wall and the area of said air inlet opening being so related that a predetermined portion of the said drawn air will be caused to flow through said wall in an amount sufficient to satisfy a predetermined requirement as to the removal of gaseous impurities, and a predetermined portion will be caused to flow through the air inlet opening, sufficient to augment in predetermined measure the air discharge stream, thereby to satisfy the desired circulatory and mixing effect suitable for the size or extent of the room or space served.

GEORGE S. DAUPHINEE.